UNITED STATES PATENT OFFICE.

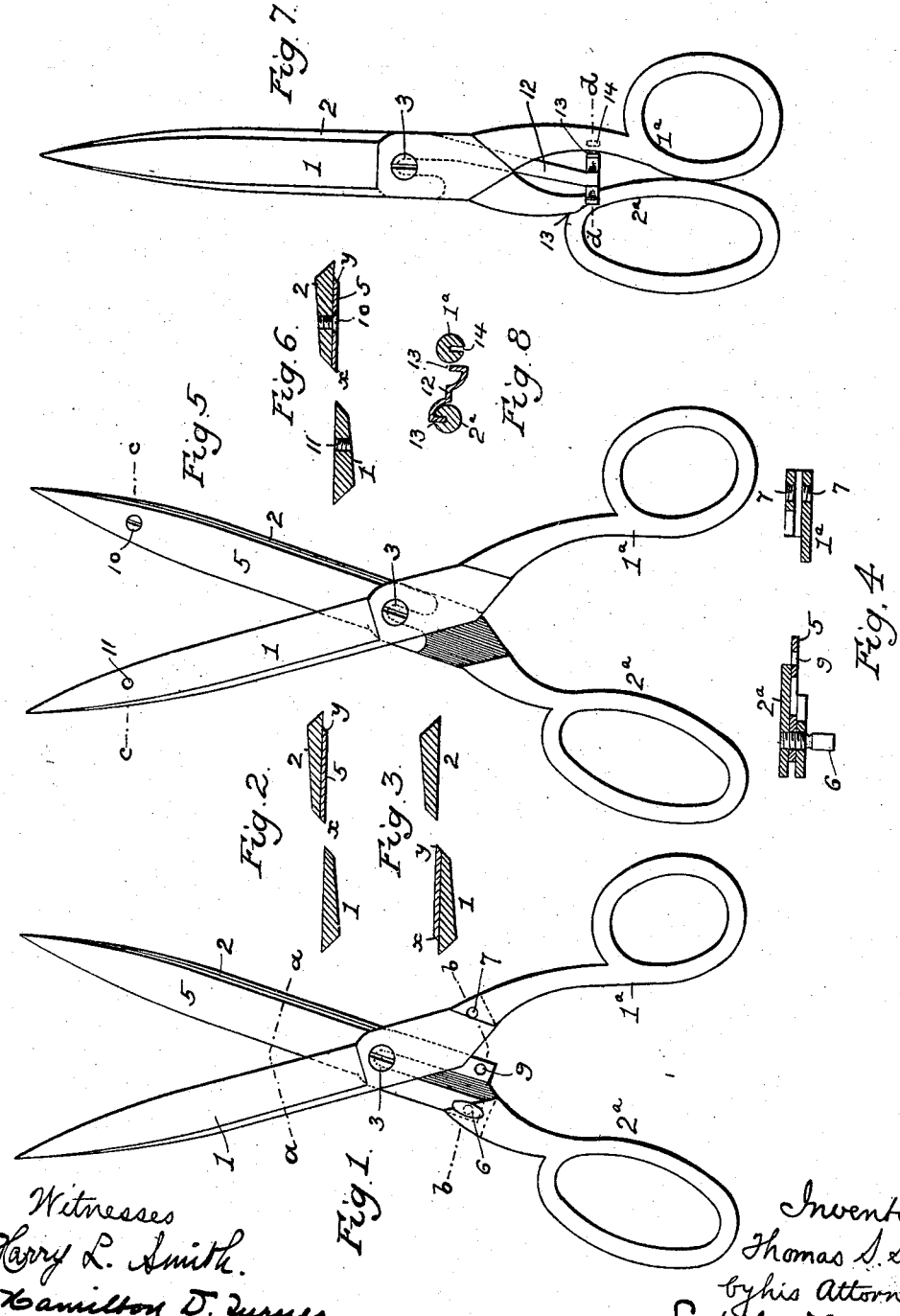

THOMAS S. SAYRE, OF CAPE MAY, NEW JERSEY, ASSIGNOR, BY DIRECT AND MESNE ASSIGNMENTS, TO SAYRE SCISSORS AND SHEARS COMPANY, OF CAPE MAY, NEW JERSEY, A CORPORATION OF NEW JERSEY.

SCISSORS OR SHEARS.

No. 867,607.  Specification of Letters Patent.  Patented Oct. 8, 1907.

Application filed November 3, 1906. Serial No. 341,869.

*To all whom it may concern:*

Be it known that I, THOMAS S. SAYRE, a citizen of the United States, residing at Cape May city, New Jersey, have invented certain Improvements in Scissors or Shears, of which the following is a specification.

The object of my invention is to so construct a pair of scissors or shears (hereafter, for convenience, simply termed shears) that new and sharp cutting edges can be readily brought into use when the original cutting edges have become dull. This object I attain by providing a supplementary cutting blade sharpened on both edges and susceptible of being secured to either blade of the shears, so as to move with the same, said supplementary blade when in either position, presenting a cutting edge for coöperation with that of the blade opposed to the one to which it is attached.

In the accompanying drawing:—Figure 1 is a side view of a pair of shears provided with one form of supplementary cutting blade in accordance with my invention; Fig. 2 is an enlarged transverse section on the line $a$—$a$, Fig. 1; Fig. 3 is a similar view but illustrating the supplementary cutting blade in a position the reverse of that shown in Fig. 2; Fig. 4 is an enlarged transverse section on the line $b$—$b$, Fig. 1; Fig. 5 is a view similar to Fig. 1 but illustrating another form of supplementary cutting blade; Fig. 6 is an enlarged section on the line $c$—$c$, Fig. 5, but showing the blades of the shears in closer relation to each other than in said figure; Fig. 7 is a side view of a pair of shears illustrating still another form of supplementary cutting blade in accordance with my invention; and Fig. 8 is a transverse section on the line $d$—$d$, Fig. 7.

The shears are constructed in the usual manner, 1 and 2 representing the opposite blades of the shears which are pivoted together at 3 and have handles $1^a$ and $2^a$ of any desired character. Between the two blades of the shears is interposed a supplementary blade 5, which may simply be perforated for the passage of the pivot pin 3 but which is preferably slotted at the inner end, as shown in Fig. 1, so that it can be slipped over the pivot without the necessity of removing the latter.

The shears shown in Fig. 1 have recessed or slotted handle portions for the reception of the inner portion of the blade 5, and the latter can be secured to either blade of the shears by means of a pin, screw, stud, or equivalent fastening engaging openings in the blade and handles, the fastening device shown in the present instance being a thumb screw 6, which passes through openings 7 in the handle and through an opening 9 in the blade, and is threaded for adaptation to an internal thread in one of the openings 7.

The blade 5 is sharpened on both edges, and, when confined to the blade 2, as shown in Fig. 1, its cutting edge $x$ coöperates with the cutting edge of the blade 1, as shown in Fig. 2, but, when these cutting edges become dulled through use, the blade 5 can be shifted and secured to the blade 1 of the shears, in order that its cutting edge $y$ may coöperate with the edge of the blade 2 thereby doubling the effective use of the shears without sharpening the same. When it becomes necessary to sharpen the shears the supplementary blade is confined to each of the shear blades in turn while said blades are being sharpened, the sharpening of both the main and supplementary blades being effected simultaneously and without any additional trouble or expense.

In the shears shown in Fig. 5 the supplementary blade is secured to the main blade of the shears by means of a set screw 10, whose head is adapted to a reversely countersunk opening in the blade 5, the threaded stem of the screw being adapted to a threaded opening 11 in the main blade, and in the shears shown in Fig. 7 the supplementary blade 5 has a depending finger 12 with T-shaped end terminating in lugs 13, which can be adapted to notches 14 in the handles, in order to secure the supplementary blade to either of the main blades of the shears, each lug 13 being free from engagement with its respective handle when the other lug is in engagement.

I am aware that shears and other cutting implements have been provided with detachable cutting blades, and hence I make no claim for such construction, but

I claim:—

1. Shears having a reversible supplementary cutting blade sharpened on both edges, and adapted to be secured to either blade of the shears.

2. Shears having a reversible supplementary cutting blade sharpened on both edges and combined with means for securing it to either blade of the shears.

3. Shears having a reversible supplementary cutting blade sharpened on both edges and combined with means for securing it to either blade of the shears, said supplementary blade being mounted upon the same pivot as the main blades.

4. Shears having a reversible supplementary cutting blade sharpened on both edges, slotted for reception of the pivot pin, and combined with means for securing it to either blade of the shears.

5. Shears having a reversible supplementary cutting blade sharpened on both edges and combined with means for securing it to a handle portion of either blade of the shears.

6. Shears having a reversible supplementary cutting blade sharpened on both edges and slotted for the reception of the pivot pin, said blade being combined with means whereby one leg of its slotted portion may be secured to the handle of one blade of the shears and the other leg to the handle of the other blade of the shears.

7. Shears having a reversible supplementary cutting blade sharpened on both edges, handles constructed for the reception of the inner end of said supplementary blade, and means whereby said supplementary blade can be secured to either handle.

In testimony whereof, I have signed my name to this specification, in the presence of two subscribing witnesses.

THOMAS S. SAYRE.

Witnesses:
ERNEST W. LLOYD,
FLOYD C. HUGHES.